(12) United States Patent
Kim et al.

(10) Patent No.: US 11,380,954 B2
(45) Date of Patent: Jul. 5, 2022

(54) SECONDARY BATTERY HAVING CATHODE TERMINAL-INTEGRATED CAP PLATE

(71) Applicant: SAMSUNG SDI CO., LTD., Yongin-si (KR)

(72) Inventors: Dae Young Kim, Yongin-si (KR); Jun Sun Yong, Yongin-si (KR); Seung Ho Kwak, Yongin-si (KR); Yong Chul Seo, Yongin-si (KR); Sang Won Byun, Yongin-si (KR); Hyun Soo Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 171 days.

(21) Appl. No.: 16/616,916

(22) PCT Filed: Apr. 13, 2018

(86) PCT No.: PCT/KR2018/004342
§ 371 (c)(1),
(2) Date: Nov. 25, 2019

(87) PCT Pub. No.: WO2018/221853
PCT Pub. Date: Dec. 6, 2018

(65) Prior Publication Data
US 2021/0175567 A1 Jun. 10, 2021

(30) Foreign Application Priority Data
Jun. 1, 2017 (KR) .................. 10-2017-0068352

(51) Int. Cl.
*H01M 50/172* (2021.01)
*H01M 50/528* (2021.01)
(Continued)

(52) U.S. Cl.
CPC ..... *H01M 50/172* (2021.01); *H01M 10/0525* (2013.01); *H01M 10/0587* (2013.01);
(Continued)

(58) Field of Classification Search
CPC ............ H01M 50/528; H01M 50/543; H01M 10/0525; H01M 50/552; H01M 50/148;
(Continued)

(56) References Cited

U.S. PATENT DOCUMENTS

2011/0294001 A1* 12/2011 Byun .................. H01M 50/183
429/181
2011/0305943 A1 12/2011 Byun et al.
(Continued)

FOREIGN PATENT DOCUMENTS

KR 10-1084056 B1 11/2011
KR 10-2011-0134740 A 12/2011
(Continued)

OTHER PUBLICATIONS

International Search Report, with English translation, dated Jul. 19, 2018, for PCT/KR2018/004342, 5 pages.

*Primary Examiner* — Jonathan G Jelsma
*Assistant Examiner* — Omar M Kekia
(74) *Attorney, Agent, or Firm* — Lewis Roca Rothgerber Christie LLP

(57) ABSTRACT

Various embodiments of the present invention relate to a secondary battery, and the technical problem to be solved is to provide a secondary battery having a cathode terminal-integrated cap plate, which prevents the occurrence of weld defects during welding of a bus bar. To this end, the present disclosure provides a secondary battery comprising: a case; an electrode assembly received in the case; and a cap plate coupled to the case so as to protect the electrode assembly, wherein the cap plate includes a terminal part to which the
(Continued)

electrode assembly is electrically connected and which is formed integrally with the cap plate, and the terminal part is thicker than the cap plate.

10 Claims, 8 Drawing Sheets

(51) Int. Cl.

| | | |
|---|---|---|
| *H01M 50/538* | (2021.01) | |
| *H01M 50/552* | (2021.01) | |
| *H01M 50/562* | (2021.01) | |
| *H01M 50/148* | (2021.01) | |
| *H01M 10/0525* | (2010.01) | |
| *H01M 10/0587* | (2010.01) | |
| *H01M 50/543* | (2021.01) | |
| *H01M 50/531* | (2021.01) | |
| *H01M 50/147* | (2021.01) | |
| *H01M 10/04* | (2006.01) | |
| *H01M 10/058* | (2010.01) | |

(52) U.S. Cl.
CPC ....... *H01M 50/148* (2021.01); *H01M 50/528* (2021.01); *H01M 50/538* (2021.01); *H01M 50/552* (2021.01); *H01M 50/562* (2021.01); *H01M 10/04* (2013.01); *H01M 10/058* (2013.01); *H01M 50/147* (2021.01); *H01M 50/531* (2021.01); *H01M 50/543* (2021.01); *Y02E 60/10* (2013.01)

(58) Field of Classification Search
CPC ............. H01M 50/531; H01M 50/147; H01M 50/172; H01M 10/04; H01M 50/538; H01M 10/0587; H01M 50/562; H01M 10/058; Y02E 60/10
USPC ........................................................ 429/179
See application file for complete search history.

(56) References Cited

U.S. PATENT DOCUMENTS

| | | | |
|---|---|---|---|
| 2012/0021277 A1 | 1/2012 | Byun et al. | |
| 2012/0288746 A1* | 11/2012 | Abe | H01M 10/052 |
| | | | 429/162 |
| 2013/0040191 A1 | 2/2013 | Kim | |
| 2015/0010805 A1 | 1/2015 | Han et al. | |
| 2015/0364732 A1* | 12/2015 | Kim | H01M 50/155 |
| | | | 429/179 |
| 2016/0036009 A1* | 2/2016 | Cho | B23K 26/40 |
| | | | 429/179 |
| 2016/0141588 A1 | 5/2016 | Kim et al. | |
| 2016/0285058 A1* | 9/2016 | Harayama | H01M 50/528 |
| 2017/0018794 A1 | 1/2017 | Lee et al. | |
| 2017/0256821 A1* | 9/2017 | Suzuki | H01G 11/82 |

FOREIGN PATENT DOCUMENTS

| | | |
|---|---|---|
| KR | 10-2013-0016746 A | 2/2013 |
| KR | 10-2015-0004196 A | 1/2015 |
| KR | 10-2015-0128024 A | 11/2015 |
| KR | 10-2016-0060222 A | 5/2016 |
| KR | 10-2017-0009132 A | 1/2017 |
| KR | 10-2017-0050393 A | 5/2017 |

* cited by examiner

SECONDARY BATTERY HAVING CATHODE TERMINAL-INTEGRATED CAP PLATE

CROSS-REFERENCE TO RELATED APPLICATION(S)

This application is a National Phase Patent Application and claims priority to and the benefit of International Application Number PCT/KR2018/004342, filed on Apr. 13, 2018, which claims priority to Korean Patent Application Number 10-2017-0068352, filed on Jun. 1, 2017, the entire contents of all of which are incorporated herein by reference.

TECHNICAL FIELD

Various embodiments of the present invention provide a secondary battery having a cathode terminal-integrated cap plate.

BACKGROUND ART

A secondary battery is a power storage system which can provide an excellent energy density for converting electrical energy into chemical energy and storing the same. Unlike primary batteries, which cannot be recharged, secondary batteries are rechargeable and are widely used in IT devices, such as smart phones, cellular phones, notebook computers, tablet PCs, or the like. Recently, in order to prevent environmental pollution, electric vehicles have attracted increasing attention and high-capacity secondary batteries are employed to the electric vehicles. Accordingly, the development of secondary batteries having advantageous characteristics including high energy density, high power output and stability, is required.

The above information disclosed in this Background section is only for enhancement of understanding of the background of the described technology and therefore it may contain information that does not form the prior art that is already known in this country to a person of ordinary skill in the art.

Technical Problem to be Solved

Various embodiments of the present invention provide a secondary battery having a cathode terminal-integrated cap plate. That is to say, various embodiments of the present invention provide a secondary battery having a cathode terminal-integrated cap plate, which prevents the occurrence of weld defects during welding of a bus bar.

Technical Solutions

According to various embodiments of the present invention, there is provided a secondary battery including a case; an electrode assembly received in the case; and a cap plate coupled to the case so as to protect the electrode assembly, wherein the cap plate includes a terminal part to which the electrode assembly is electrically connected and which is formed integrally with the cap plate, and the terminal part is thicker than the cap plate.

The terminal part may include a support region upwardly extending from the cap plate and having a smaller thickness than the cap plate, and a terminal region vertically extending from the support region and having a greater thickness than the cap plate and the support region. The support region may be bent at least one time. The support region may be bent at an angle of less than 90° or greater than 90° with respect to a lengthwise direction of the cap plate. The cap plate may have a thickness ranging from 1.5 mm to 2.5 mm, the support region may have a thickness ranging from 0.5 mm to 1 mm, and the terminal region may have a thickness ranging from 2.5 mm to 3.5 mm.

The terminal part may further include at least one protrusion protruding downwardly, and a collector plate connected to the electrode assembly to then extend is connected to the protrusion. The electrode assembly may include an uncoated portion extending in a direction parallel with a lengthwise direction of the cap plate, and the collector plate may be connected to the uncoated portion.

The electrode assembly may include multi-tabs extending in a direction perpendicular to a lengthwise direction of the cap plate, and the multi-tabs may be connected to the terminal part.

The cap plate and the terminal part may be made of aluminum 1000 series or 3000 series alloys.

Advantageous Effects

Various embodiments of the present invention provide a secondary battery having a cathode terminal-integrated cap plate. That is to say, various embodiments of the present invention provide a secondary battery having a cathode terminal-integrated cap plate, which prevents the occurrence of weld defects during welding of a bus bar.

In other words, various embodiments of the present invention provide a secondary battery having a cathode terminal-integrated cap plate, in which the terminal part is thicker than the cap plate, and throughholes are not formed in the cathode terminal using laser beam when a bus bar is laser-welded to the cathode terminal.

In addition, various embodiments of the present invention provide a secondary battery in which a support region connecting the cap plate and the cathode terminal (terminal region) is thicker than the cap plate, and the support region is bent multiple times or is tilted at an angle other than 90° with respect to the cap plate, thereby stably supporting the bus bar/terminal region by the support region when the bus bar is welded onto the cathode terminal.

In addition, various embodiments of the present invention provide a secondary battery having a cathode terminal-integrated cap plate having excellent corrosion resistance, excellent electrical/thermal conductivity, excellent forming processability and excellent welding performance by manufacturing the cathode terminal-integrated cap plate using aluminum 1XXX series or 3XXX series alloy.

BEST MODE FOR CARRYING OUT THE INVENTION

Figure 1:
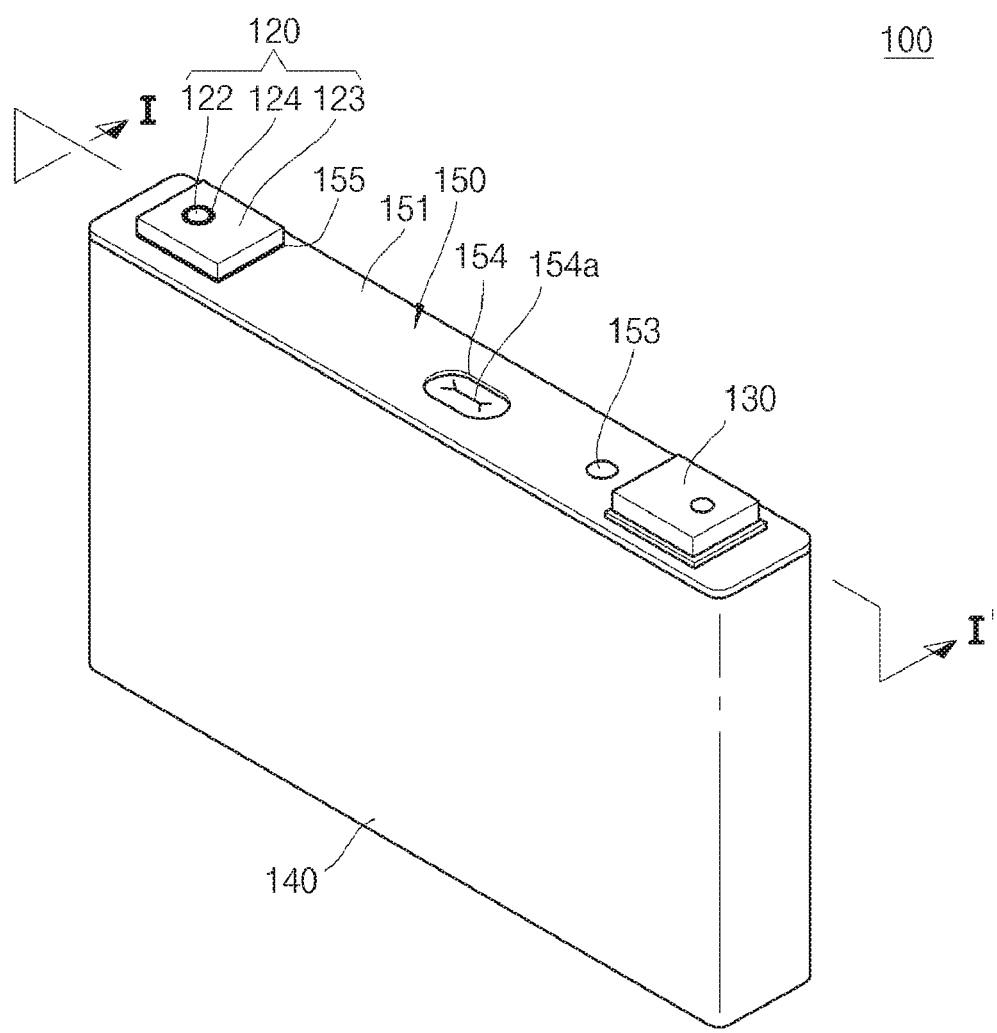
FIG. 1 is a perspective view of a secondary battery having a cathode terminal-integrated cap plate according to various embodiments of the present invention.

Hereinafter, embodiments of the present invention will be described in detail.

Various embodiments of the present invention may be embodied in many different forms and should not be construed as being limited to the embodiments set forth herein. Rather, these embodiments of the disclosure are provided so that this disclosure will be thorough and complete and will convey inventive concepts of the disclosure to those skilled in the art.

In the accompanying drawings, sizes or thicknesses of various components are exaggerated for brevity and clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present and the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "below," "beneath," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the exemplary term "below" can encompass both an orientation of above and below.

In addition, the expression "cathode terminal-integrated cap plate" described in the present disclosure means that a cap plate shaped of a rectangular planar plate has a cathode terminal integrated with the cap plate through multiple forging processes. In the drawings, thicknesses or widths of a cathode terminal and a cap plate are exaggerated for clarity, or illustration of some portions is omitted to avoid unnecessarily obscuring the subject matter of the present disclosure. For example, although a short-circuit plate may be provided in an anode terminal and a fuse may be provided in a current collector plate, they are not illustrated because they do not come under the subject matter of the present disclosure. In the present disclosure, the anode terminal may also be referred to as a first terminal and the cathode terminal may also be referred to as a second terminal or a terminal part in some instances.

Figure 2:
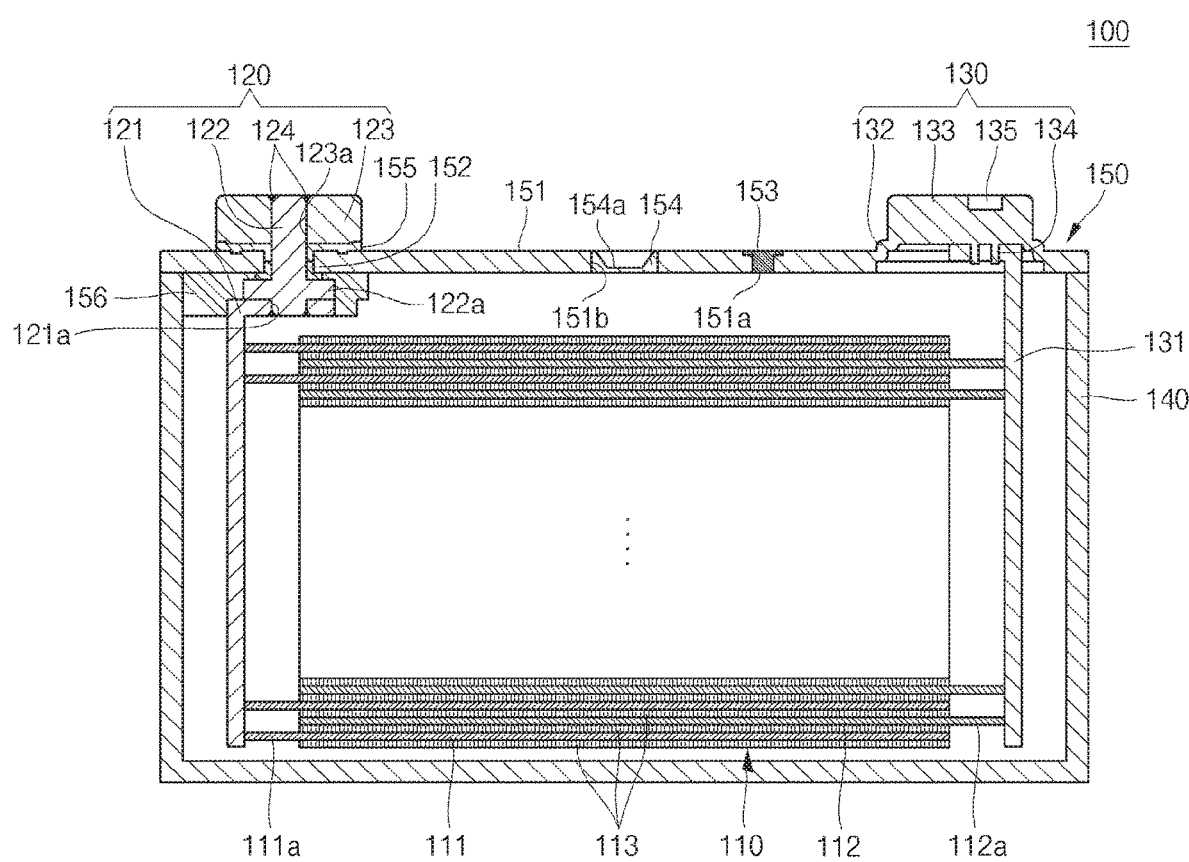
FIG. 2 is a cross-sectional view of the secondary battery taken along the line I-I' of FIG. 1.

FIG. 1 is a perspective view of a secondary battery 100 having a cathode terminal-integrated cap plate according to various embodiments of the present invention. FIG. 2 is a cross-sectional view of the secondary battery taken along the line I-I' of FIG. 1.

As shown in FIGS. 1 and 2, the secondary battery 100 according to an embodiment of the present invention includes an electrode assembly 110, a first terminal 120, a second terminal 130, a case 140 and a cap assembly 150.

The electrode assembly 110 is manufactured by winding or laminating a stacked structure including a first electrode plate 111, a separator 113, and second electrode plate 112, which are thin plates or layers. Here, the first electrode plate 111 may operate as an anode and the second electrode plate 112 may operate as a cathode, and vice versa.

The first electrode plate 111 may be formed by coating a first electrode active material, such as graphite or carbon on a first electrode current collector made of a metal foil including copper, a copper alloy, nickel or a nickel alloy, and may include a first electrode uncoated portion 111a where the first electrode active material is not coated. The first electrode uncoated portion 111a may become a path for the flow of current between the first electrode plate 111 and an exterior side of the first electrode plate 111. Meanwhile, aspects of the present invention are not limited to the materials of the first electrode plate 111 disclosed herein.

The second electrode plate 112 may be formed by coating a second electrode active material, such as a transition metal oxide, on a second electrode current collector made of a metal foil including aluminum or an aluminum alloy, and may include a second electrode uncoated portion 112a where the second electrode active material is not coated. The second electrode uncoated portion 112a may become a path for the flow of current between the second electrode plate 112 and an exterior side of the second electrode plate 112. Meanwhile, aspects of the present invention are not limited to the materials of the second electrode plate 112 disclosed herein.

Polarities of the first electrode plate 111 and the second electrode plate 112 may change, and the first electrode plate 111 and the second electrode plate 112 may then be suitably arranged.

The separator 113 may be positioned between the first electrode plate 111 and the second electrode plate 112 to prevent an electrical short from occurring therebetween and may allow lithium ions to move. The separator 113 may be made of polyethylene, polypropylene or a composite film of polyethylene and polypropylene. Meanwhile, aspects of the present invention are not limited to the materials of the separator 113 disclosed herein.

The first terminal 120 and the second terminal 130 electrically connected to the first electrode plate 111 and the second electrode plate 112, respectively, are located at opposite ends of the electrode assembly 110.

The electrode assembly 110 is substantially accommodated in the case 140 with an electrolyte. The electrolyte may include lithium salt, such as $LiPF_6$ or $LiBF_4$, dissolved in an organic solvent, such as EC, PC, DEC, EMC, or DMC. The electrolyte may be in a liquid, solid or gel phase.

The first terminal 120 is made of a metal and is electrically connected to the first electrode plate 111. The first terminal 120 includes a first collector plate 121, a first terminal pillar 122 and a first terminal plate 123. Here, the first terminal pillar 122 is electrically/mechanically connected between the first collector plate 121 and the first terminal plate 123.

The first collector plate 121 comes into contact with the first electrode uncoated portion 111a protruding to one side (e.g., the left) of the electrode assembly 110. Substantially, the first collector plate 121 is welded to the first electrode uncoated portion 111a. The first collector plate 121 is formed in a substantially 'inverted L' (⌐) shape, and a terminal hole 121a is located at its top portion. The first terminal pillar 122 is fitted into the terminal hole 121a to then be riveted or welded. The first collector plate 121 is made of copper or a copper alloy. However, aspects of the present invention are not limited to the materials of the first collector plate 121 disclosed herein.

The first terminal pillar 122 penetrates a cap plate 151, which will later be described, to upwardly protrude and extend a predetermined length, and may be electrically connected to the first collector plate 121 under the cap plate 151. In addition, the first terminal pillar 122 upwardly protrudes and extends a predetermined length from the cap plate 151, and a flange 122a is located at a lower portion positioned below the cap plate 151 to prevent the first terminal pillar 122 from being dislodged from the cap plate 151. In the first terminal pillar 122, a portion of the first terminal pillar 122 positioned below the flange 122a is fitted into the first terminal hole 121a of the first collector plate 121 to then be riveted or welded. Here, the first terminal pillar 122 is electrically insulated from the cap plate 151.

The first terminal pillar 122 may penetrate the cap plate 151 and may be made of, for example, copper, a copper alloy, nickel, a nickel alloy, aluminum or an aluminum alloy.

The first terminal plate 123 has a hole 123a, and the first terminal pillar 122 is coupled to and welded to the hole 123a. Here, the first terminal plate 123 may be made of aluminum or an aluminum alloy. In addition, in one embodiment, laser beam is supplied to boundary areas of the upwardly exposed first terminal pillar 122 and the first terminal plate 123, thereby allowing the boundary areas to be fused to each other, followed by cooling and welding. Regions resulting after the welding are denoted by reference numeral 124 in FIG. 3.

As described above, since the first terminal plate 123 is made of aluminum or an aluminum alloy, a bus bar (not shown) may be easily welded to the first terminal plate 123 made of aluminum or an aluminum alloy.

The second terminal 130 is also made of a metal and is electrically connected to the second electrode plate 112. Substantially, the second terminal 130 is integrally formed with the cap plate 151 and is made of the same material as the cap plate 151 accordingly. The second terminal 130 may include a second collector plate 131, a support region 132, a terminal region 133 and a protrusion 134. Here, the support region 132, the terminal region 133 and the protrusion 134 may be produced by a forging process when the cap plate 151 is formed. In addition, a recess 135 may be formed on a top surface of the terminal region 133 to produce the protrusion 134.

The second collector plate 131 comes into contact with the second electrode uncoated portion 112a protruding to the other side (e.g., the right) of the electrode assembly 110. Substantially, the second collector plate 131 is formed in a substantially 'counterclockwise rotated L' (¬) shape, and a terminal hole is located at its top portion. The protrusion 134 downwardly protruding from the terminal region 133 is fitted into and coupled to the hole of the second collector plate 131. After being coupled to the hole of the second collector plate 131, the protrusion 134 may be riveted or welded. The second collector plate 131 may be made of, for example, aluminum or an aluminum alloy. However, aspects of the present invention are not limited to the materials of the second collector plate 131 disclosed herein.

The support region 132 upwardly extends a predetermined length from the cap plate 151, and a terminal region 133 is located at a top end of the support region 132. A height or thickness of the terminal region 133 may be equal to that of the first terminal plate 123, and the terminal region 133 may have an outer shape similar to that of the first terminal plate 123. In addition, since the terminal region 133 is also made of aluminum or an aluminum alloy, a bus bar (not shown) made of aluminum or an aluminum alloy may be easily welded to the terminal region 133. Here, since the terminal region 132 is integrally formed with the cap plate 151, the cap plate 151 and the case 140, which will later be described, may have the same polarity as the second terminal 130 (e.g., a positive polarity). Accordingly, the second terminal 130 may operate as a cathode terminal.

Meanwhile, a winding axis of the electrode assembly 110 (a horizontal axis in a left-right direction in FIG. 2) is substantially perpendicular or substantially orthogonal to terminal axes of the first terminal 120 and the second terminal 130 (a vertical axis in a top-bottom direction in FIG. 2).

The case 140 is made of a conductive metal, such as aluminum, an aluminum alloy or nickel plated steel and has an approximately rectangular shape to have an opening so that the electrode assembly 110 can be inserted and placed therein. Since the case 140 and the cap assembly 150 assembled with each other are shown in FIG. 2, the opening is not illustrated. However, the opening corresponds to a substantially opened part of the periphery of the cap assembly 150. Meanwhile, the inner surface of the case 140 may be subjected to insulation treatment to be electrically insulated from the electrode assembly 110, the first terminal 120, the second terminal 130 and the cap assembly 150.

The cap assembly 150 is coupled to the case 140. Specifically, the cap assembly 150 includes the cap plate 151, a seal gasket 152, a plug 153, a safety vent 154, an upper insulation member 155 and a lower insulation member 156.

The cap plate 151 seals the opening of the case 140 and may be made of the same material as the case 140. The cap plate 151 may be coupled to the case 140 by, for example, laser welding. Here, since the cap plate 151 has the same polarity as the second terminal 130, as described above, the cap plate 151 and the case 140 may have the same polarity. In addition, since the second terminal 130 is integrally formed with the cap plate 151, the second terminal 130 may be considered as one element of the cap plate 151.

The seal gasket 152 is made of an insulating material and is positioned between the first terminal pillar 122 and the cap plate 151. The seal gasket 152 may prevent external moisture from infiltrating into the secondary battery 100 or may prevent an electrolyte accommodated in the secondary battery 100 from flowing out.

The plug 153 seals an electrolyte injection hole 151a of the cap plate 151, and the safety vent 154 is installed in a vent hole 151b of the cap plate 151 and includes a notch 154a configured to be opened at a preset pressure.

The upper insulation member 155 is located between the first terminal pillar 122 and the cap plate 151. In addition, the upper insulation member 155 comes into close contact with the cap plate 151. Moreover, the upper insulation member 155 may also come into close contact with the seal gasket 152. The upper insulation member 155 electrically insulates the first terminal pillar 122, the first terminal plate 123 and the cap plate 151 from one another.

The lower insulation member 156 is located between the first collector plate 121 and the cap plate 151 to prevent an unnecessary electrical short circuit. That is to say, the lower insulation member 156 prevents an electrical short circuit from occurring between the first collector plate 121 and the cap plate 151.

Figure 3A:
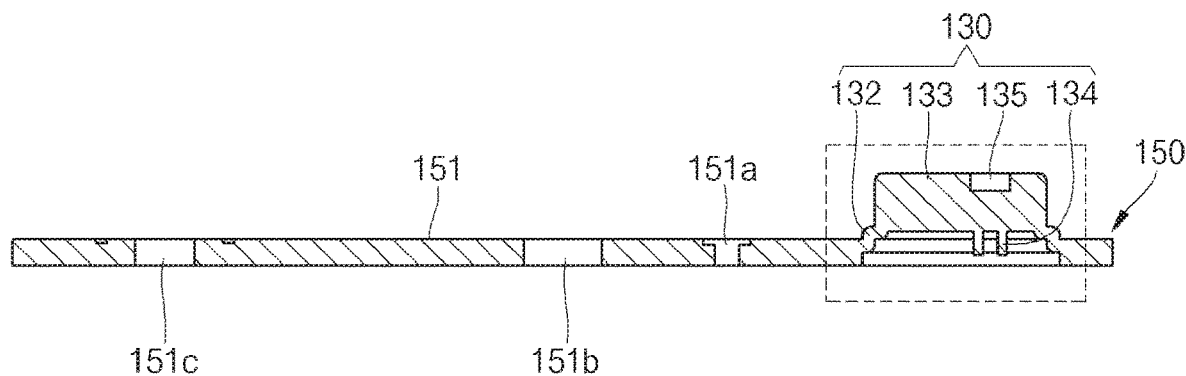
FIGS. 3A and 3B are cross-sectional views illustrating a cap plate and a cathode terminal of a secondary battery according to various embodiments of the present invention.
Figure 3B:
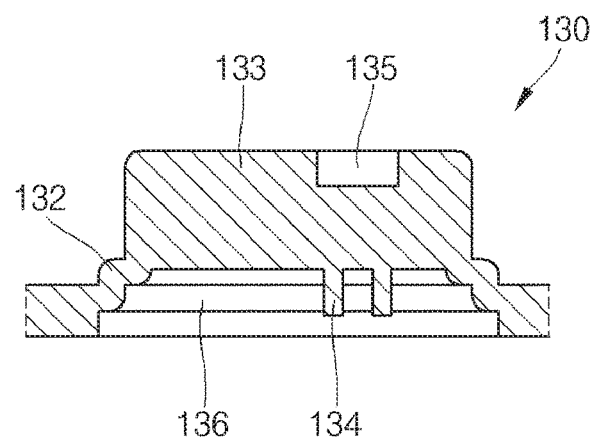

FIGS. 3A and 3B are cross-sectional views illustrating a cap plate 151 and a cathode terminal 130 (second terminal) of a secondary battery according to various embodiments of the present invention.

As shown in FIGS. 3A and 3B, the cap plate 151 is electrically connected to an electrode assembly and includes a cathode terminal 130 integrally formed with the cap plate 151. Here, the cathode terminal 130 is thicker than the cap plate 151. The cathode terminal 130 will now be described in more detail.

As described above, the cathode terminal 130 may include the support region 132 and the terminal region 133. In addition, the cathode terminal 130 may include multiple protrusions 134, and a groove 135 for forming the protrusions 134.

The support region 132 upwardly extends a predetermined length from the cap plate 151 and has a smaller thickness than the cap plate 151. In addition, the support region 132 is bent at least once to be connected to the terminal region 133. The support region 132 may be bent in a curved shape. Moreover, the support region 132 may be bent at an angle of smaller than or greater than approximately 90° with respect to a lengthwise direction of the cap plate 151. That is to say, the support region 132 may be bent at an obtuse angle (e.g., 110° to 150°) or an acute angle (e.g., 20° to 60°) with respect to the lengthwise direction of the cap plate 151.

Therefore, when welding is performed using laser beam in a state in which a bus bar (not shown) is mounted on the terminal region 133, the support region 132 tilted at an acute angle or an obtuse angle with respect to the cap plate 151 or bent multiple times may elastically/stably support the terminal region 133 and the bus bar. Accordingly, the welding between the terminal region 133 and the bus bar can be efficiently achieved.

The terminal region 133 substantially horizontally extends from the support region 132 and has a greater thickness than the cap plate 151 and the support region 132. That is to say, the terminal region 133 is located at the top end of the support region 132, which is substantially horizontal with a surface of the cap plate 151. Specifically, since the terminal region 133 having a greater thickness than the cap plate 151 and the support region 132 is in a substantially bulk or solid shape, the laser beam cannot penetrate the terminal region 133 when laser welding is performed in a state in which the bus bar is mounted on the terminal region 133.

The protrusion 134 downwardly extends a predetermined length from the terminal region 133, and a second collector plate may be coupled to the protrusion 134 to then be riveted/welded, as described above. In some instances, the protrusion 134 may not be provided or the second collector plate may be directly connected (welded) to a bottom surface of the terminal region 133. In addition, the second collector plate may be directly connected (welded) to a bottom surface of the cap plate 151 in some instances.

In addition, as the result of forming the support region 132 and the terminal region 133, a cavity 136 may be provided at a region below the support region 132 and the terminal region 133, and the second collector plate may be guided to the interior of the cavity 136 to then be coupled to the protrusion 134.

Next, the absolute thicknesses of the cap plate 151, the support region 132 and the terminal region 133 may vary in various manners according to the size, capacity and characteristics of secondary battery and customer demands. However, in a secondary battery generally used for an automotive vehicle or an energy storage system (ESS), the cap plate 151 may have a thickness ranging from approximately 1.5 mm to approximately 2.5 mm. In this case, the support region 132 may have a thickness ranging from 0.5 mm to 1 mm, and the terminal region may have a thickness ranging from 2.5 mm to 3.5 mm.

Here, if the thickness of the support region 132 is smaller than approximately 0.5 mm, the support region 132 may have low rigidity so as to be easily ruptured during welding with a bus bar or due to external shocks. If the thickness of the support region 132 is greater than approximately 1 mm, the support region 132 may have lower capability of elastically supporting the bus bar/the terminal region.

In addition, if the thickness of the terminal region 133 is smaller than approximately 2.5 mm, throughholes may be formed in the terminal region 133 during laser welding of the bus bar, and if the thickness of the terminal region 133 is greater than approximately 3.5 mm, it may deviate from the standard thickness range of conventional terminal part.

In FIG. 3A, undefined reference numeral 151c denotes a throughhole where the first terminal pillar 122, the seal gasket 152 and the upper insulation member 155 are located.

Figure 4A:
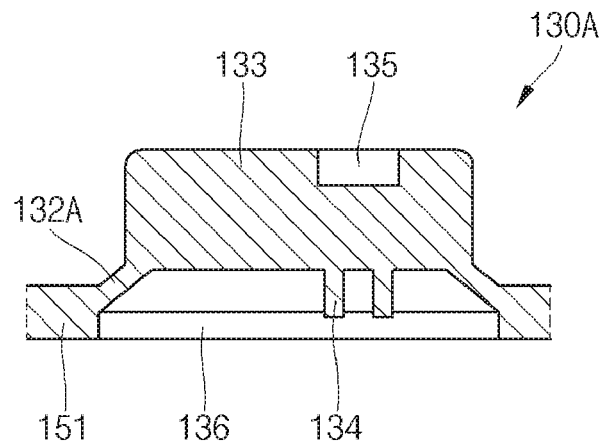
FIGS. 4A and 4B are cross-sectional views illustrating a cathode terminal of a secondary battery according to various embodiments of the present invention.
Figure 4B:
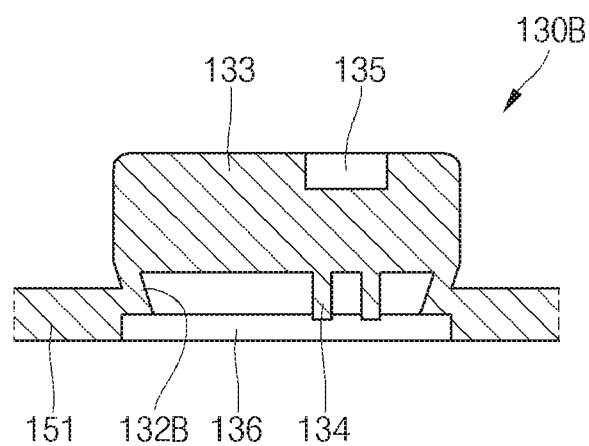

FIGS. 4A and 4B are cross-sectional views illustrating a cathode terminal 130A, 130B of a secondary battery according to various embodiments of the present invention.

As shown in FIG. 4A, a support region 132A of the cathode terminal 130A is at an obtuse angle (e.g., 110° to 150°) with respect to the cap plate 151 to be bent up to a terminal region 133 in a straight shape. In addition, as shown in FIG. 4B, a support region 132B of the cathode terminal 130B is at an acute angle (e.g., 20° to 60°) with respect to the cap plate 151 to be bent up to the terminal region 133 in a straight shape.

As described above, when the bus bar is mounted on the cathode terminal 130 to then be welded, the support region 132 elastically/stably supports the cathode terminal 130 and the bus bar. Therefore, the cathode terminal 130 and the bus bar are laser-welded with improved welding quality.

Figure 5:
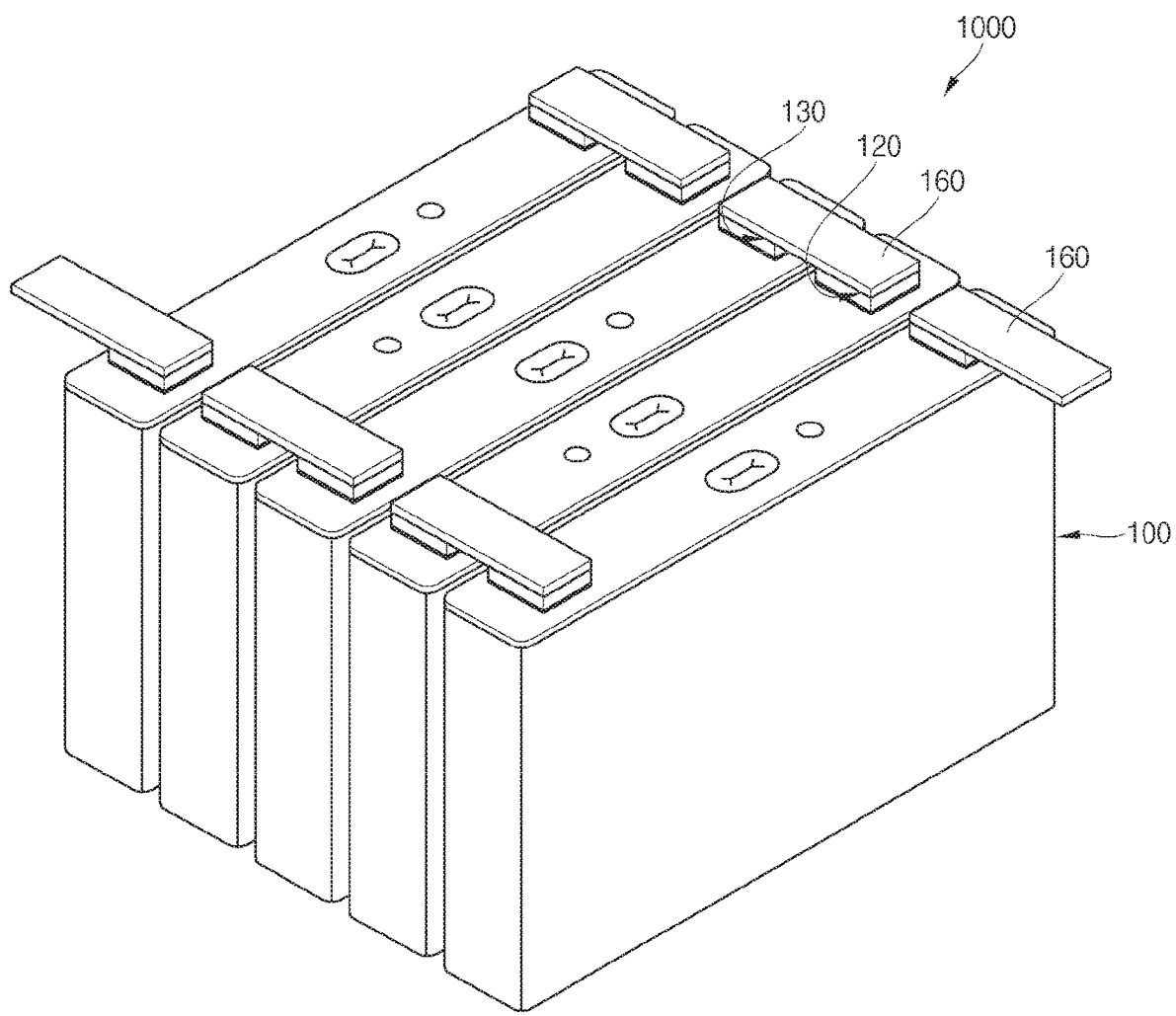
FIG. 5 is a perspective view illustrating an example battery module using a secondary battery according to various embodiments of the present invention.

FIG. 5 is a perspective view illustrating an example of a battery module (1000) using a secondary battery according to various embodiments of the present invention.

As shown in FIG. 5, multiple secondary batteries 100 are aligned in a line, and multiple bus bars 160 are coupled to the aligned secondary batteries 100, thereby completing a battery module 1000. For example, a first terminal (anode terminal) 120 of one of the multiple secondary batteries 100 and a second terminal (cathode terminal) 130 of another of the multiple secondary batteries 100, which is adjacent to the one secondary battery 100, are welded to each other by the bus bars 160, thereby providing the battery module 1000 having the multiple secondary batteries 100 connected in series to one another. Here, the bus bars 160 may be made of aluminum or an aluminum alloy. Here, the first terminal plate 124 of the first terminal 120 and the terminal region 133 of the second terminal 130 are also made of aluminum or an aluminum alloy, thereby allowing the bus bar 160 to be easily welded to the first terminal 120 and/or the second terminal 130.

Figure 6:
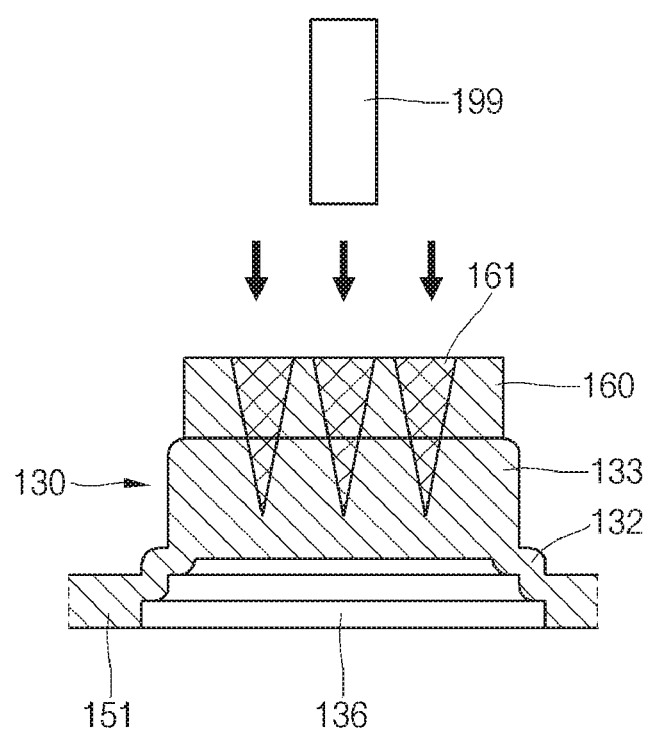
FIG. 6 is a cross-sectional view illustrating a state in which a bus bar is welded to a cathode terminal in a secondary battery according to various embodiments of the present invention.

FIG. 6 is a cross-sectional view illustrating a state in which a busbar 160 is welded to a cathode terminal 130 in a secondary battery according to various embodiments of the present invention.

As shown in FIG. 6, according to the embodiment of the present invention, the bus bar 160 may be welded to the terminal region 133 of the cathode terminal 130 using laser beam based on a laser tool 199. Here, integrated welding regions 161 are formed in the busbars 160 and the cathode terminal 130 using the laser beam. If depths of the welding regions 161 are greater than the thickness of the terminal region 133, throughholes may be formed in the terminal region 133, and a weld defect may occur due to the throughholes. Like in the secondary battery according to the embodiment of the present invention, however, the thickness of the terminal region 133 of the cathode terminal 130 may be greater than that of the cap plate 151, and the depths of the welding regions 161 formed in the terminal region 133 during laser welding may be smaller than the thickness of the terminal region 133. Therefore, the busbars 160 can be welded to the terminal region 133 of the cathode terminal 130 without a weld defect.

Figure 7A:
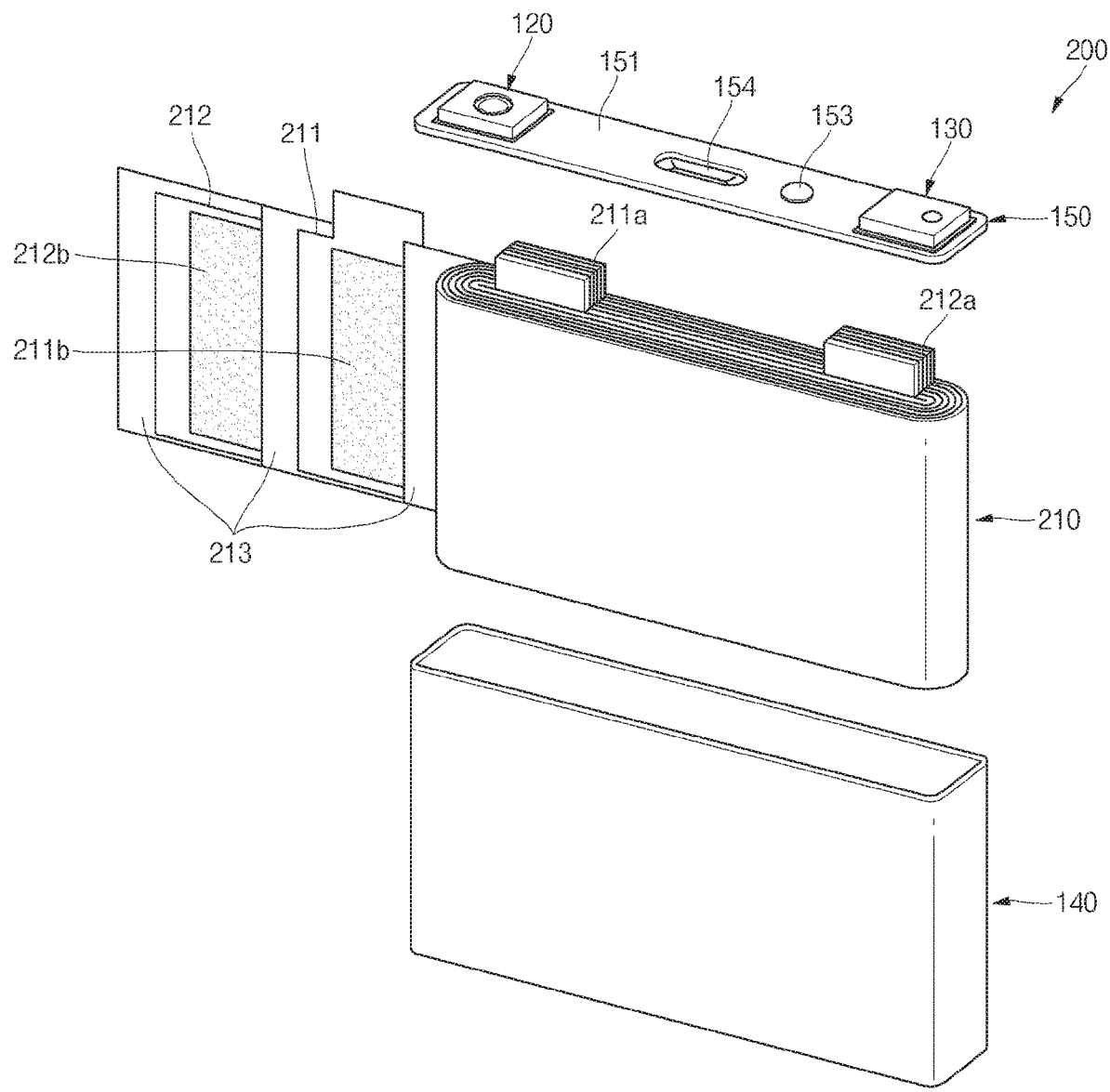
FIGS. 7A and 7B are an exploded perspective view and a cross-sectional view of a secondary battery having a cathode terminal-integrated cap plate according to various embodiments of the present invention.
Figure 7B:
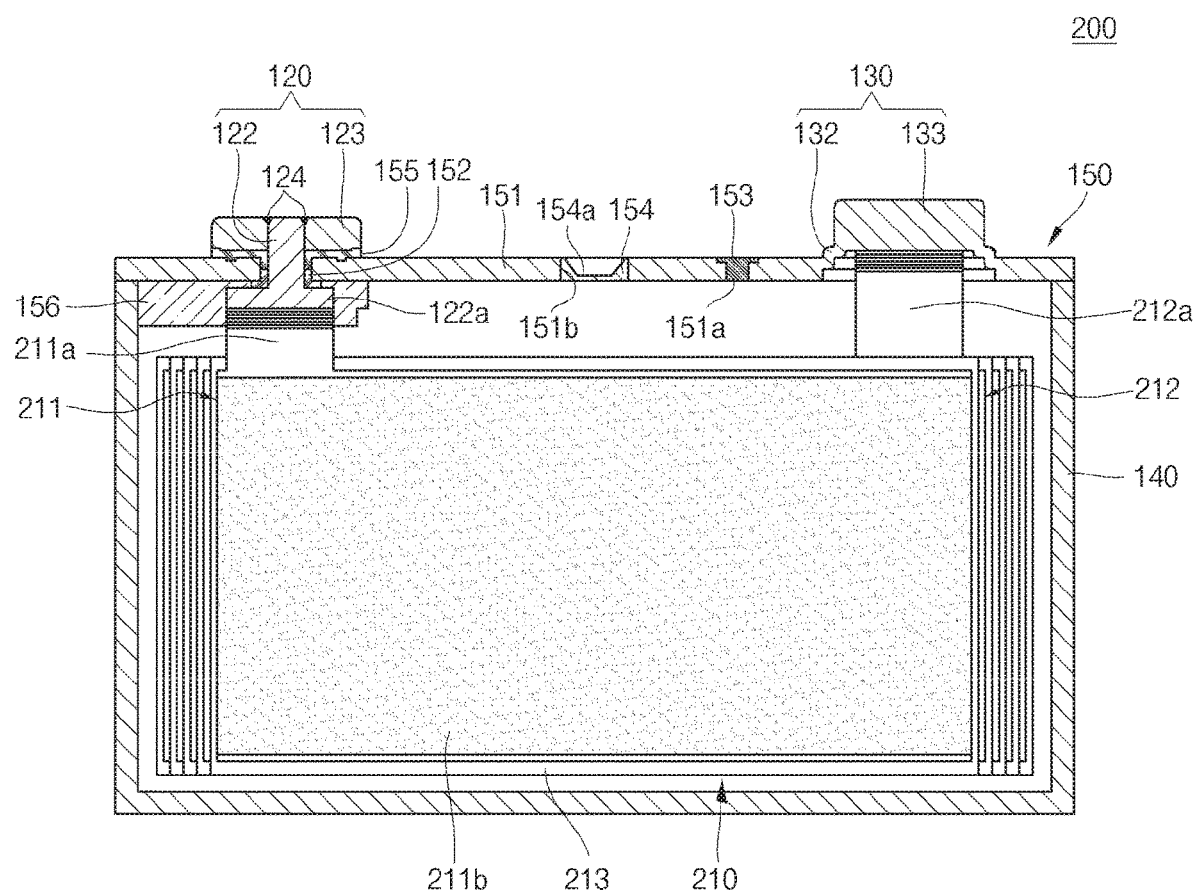

FIGS. 7A and 7B are an exploded perspective view and a cross-sectional view of a secondary battery 200 having a cathode terminal-integrated cap plate according to various embodiments of the present invention.

The secondary battery 200 according to still another embodiment of the present invention has a different configuration as that of the secondary battery 100 according to the previous embodiment of the present invention in view of connection relationships between the electrode assembly 210 and terminals 120 and 130. That is to say, the secondary battery 200 also includes the cathode terminal-integrated cap plate 151, which is the same as or similar to that of the secondary battery 100 in view of configuration. Therefore, a description about the cathode terminal-integrated cap plate 151 of the secondary battery 200 will be minimized.

As shown in FIGS. 7A and 7B, a winding axis of the electrode assembly 210 may be substantially parallel or substantially horizontal with respect to the terminal axes of the first terminal 120 and the second terminal 130. Here, the winding axis and the terminal axes may refer to axes in a top-bottom direction in FIGS. 7A and 7B. In addition, it means that when the winding axis and the terminal axes are referred to as being "substantially parallel or arranged substantially horizontal with respect to each other", they may not meet each other even by stretching them a suitably long distance or they may still eventually meet each other by stretching them along an extremely long distance.

In addition, a first multi-tab 211a is positioned between the electrode assembly 210 and the first terminal pillar 122 of the first terminal 120, and a second multi-tab 212a is positioned between the electrode assembly 210 and the terminal region 133 of the second terminal 130. That is to say, the first multi-tab 211a extends from a top end of the electrode assembly 210 to a bottom end of the first terminal pillar 122 of the first terminal 120 to be electrically connected to or welded to a planar flange 122a provided in the first terminal pillar 122. In addition, the second multi-tab 212a extends from the top end of the electrode assembly 210 to a bottom end of the terminal region 133 of the second terminal 130 to be electrically connected or welded.

Substantially, the first multi-tab 211a may be a first uncoated portion itself of a first electrode plate 211 of the electrode assembly 210, which is not coated with a first active material 211b, or a separate member connected to the first uncoated portion. Here, the material of the first uncoated portion may be the same as the material of the first electrode plate 211, and the material of the separate member may be one selected from the group consisting of nickel, a nickel alloy, copper, a copper alloy, aluminum, an aluminum alloy, and equivalents thereof.

In addition, substantially, the second multi-tab 212a may be a second uncoated portion itself of a second electrode plate 212 of the electrode assembly 210, which is not coated with a second active material 212b, or a separate member connected to the second uncoated portion. Here, the material of the second uncoated portion may be the same as the material of the second electrode plate 212, and the material of the separate member may be one selected from the group consisting of aluminum, an aluminum alloy, nickel, a nickel alloy, copper, a copper alloy, and equivalents thereof.

As described above, since a winding axis of the electrode assembly may be substantially parallel or substantially horizontal with respect to terminal axes of the first and second terminals, the electrode assembly may demonstrate excellent electrolyte wetting capability during electrolyte injection and internal gases may rapidly move to a safety vent to allow the safety vent to quickly operate during over-charge.

In addition, since a multi-tab (an uncoated portion itself or a separate member) of the electrode assembly is directly electrically connected to a terminal part to shorten an electrical path, the secondary battery may have reduced internal resistance while reducing the number of components.

Meanwhile, the cathode terminal-integrated cap plate according to the embodiment of the present invention may be made of aluminum an aluminum alloy. That is to say, the cathode terminal-integrated cap plate may be made of one selected from the group consisting of 1XXX series alloys, that is, pure aluminum of 99.0% or greater purity, 2XXX series alloys, that is, Al—Cu alloys, 3XXX series alloys, that is, Al—Mn alloys, 4XXX series alloys, that is, Al—Si alloys, 5XXX series alloys, that is, Al—Mg alloys, 6XXX series alloys, that is, Al—Mg—Si alloys, and 7XXX series alloys, that is, Al—Zn—(Mg,Cu) alloys.

Specifically, the cathode terminal-integrated cap plate may be made of according to the embodiment of the present invention can be made of pure aluminum, which is a 1XXX series alloy having excellent corrosion resistance, superb electrical and thermal conductivities, and good weldability and workability, or non-heat treatable alloys, which are 3XXX series alloys having various properties acquired by a cooling process with manganese as a principle alloying element, including a higher strength than pure aluminum, good weldability, corrosion resistance and workability.

Specifically, in the cathode terminal-integrated cap plate according to the embodiment of the present invention, since the support region thinner than the cap plate and the terminal region thicker than the cap plate need to be formed through various forging processes, as described above, the 1XXX series alloy or the 3XXX series alloys may be most suitably used.

The cathode terminal-integrated cap plate according to the embodiment of the present invention may include, but not limited to, aluminum 1050 series alloys including, for example, aluminum: 99.5% min, copper: 0.05% max, iron: 0.4% max, magnesium: 0.05% max, manganese: 0.05% max, silicon: 0.25% max, titanium: 0.03% max, vanadium: 0.05% max, and zinc: 0.05% max, but are not limited thereto. Additionally, aluminum 1060, 1100, or 1199 series alloys may also be used.

In addition, the cathode terminal-integrated cap plate according to the embodiment of the present invention may include, but not limited to, aluminum 3003 series alloys including, for example, aluminum: 96.8 to 99%, copper: 0.05 to 0.20%, iron: 0.70% max, manganese: 1.0 to 1.5%, silicon: 0.6% max, zinc: 0.1% max, and residuals: 0.15% max. Additionally, aluminum 3004 or 3102 series alloys may also be used.

Although the foregoing embodiments have been described to practice the secondary battery of the present invention, these embodiments are set forth for illustrative purposes and do not serve to limit the invention. Those skilled in the art will readily appreciate that many modifications and variations can be made, without departing from the spirit and scope of the invention as defined in the appended claims, and such modifications and variations are encompassed within the scope and spirit of the present invention.

The invention claimed is:

1. A secondary battery comprising:
a case;
an electrode assembly received in the case; and
a cap plate coupled to the case so as to protect the electrode assembly,
wherein the cap plate includes a terminal part to which the electrode assembly is electrically connected and which is formed integrally with the cap plate, and the terminal part is thicker than the cap plate, and
wherein the terminal part includes:
a support region upwardly extending from the cap plate and having a smaller thickness than the cap plate; and
a terminal region vertically extending from the support region, and
the cap plate has a thickness ranging from 1.5 mm to 2.5 mm, the support region has a thickness ranging from 0.5 mm to 1 mm, and the terminal region has a thickness ranging from 2.5 mm to 3.5 mm.

2. The secondary battery of claim 1, wherein the thickness of the terminal region is greater than the thickness of the cap plate.

3. The secondary battery of claim 1, wherein the support region is bent at least one time.

4. The secondary battery of claim 1, wherein the terminal part further includes at least one protrusion protruding downwardly, and a collector plate connected to the electrode assembly to then extend is connected to the protrusion.

5. The secondary battery of claim 4, wherein the electrode assembly includes an uncoated portion extending in a direction parallel with a lengthwise direction of the cap plate, and the collector plate is connected to the uncoated portion.

6. The secondary battery of claim 1, wherein the electrode assembly includes multi-tabs extending in a direction perpendicular to a lengthwise direction of the cap plate, and the multi-tabs are connected to the terminal part.

7. The secondary battery of claim 1, wherein the cap plate and the terminal part are made of aluminum 1000 series or 3000 series alloys.

8. A secondary battery comprising:
a case;
an electrode assembly received in the case; and
a cap plate coupled to the case so as to protect the electrode assembly,
wherein the cap plate includes a terminal part to which the electrode assembly is electrically connected and which is formed integrally with the cap plate, and the terminal part is thicker than the cap plate, and
wherein the terminal part includes:
a support region upwardly extending from the cap plate and having a smaller thickness than the cap plate; and
a terminal region vertically extending from the support region, and
the support region is bent at an angle of less than 90° or greater than 90° with respect to a lengthwise direction of the cap plate.

9. The secondary battery of claim 8, wherein the support region is bent at an obtuse angle of 110° to 150° with respect to the lengthwise direction of the cap plate.

10. The secondary battery of claim 8, wherein the support region is bent at an acute angle of 20° to 60° with respect to the lengthwise direction of the cap plate.

* * * * *